(12) United States Patent
Chen et al.

(10) Patent No.: US 7,961,925 B2
(45) Date of Patent: Jun. 14, 2011

(54) METHOD AND SYSTEM FOR DUAL ENERGY IMAGE REGISTRATION

(75) Inventors: Yunqiang Chen, Plainsboro, NJ (US); Tong Fang, Morganville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 893 days.

(21) Appl. No.: 11/934,273

(22) Filed: Nov. 2, 2007

(65) Prior Publication Data

US 2008/0112649 A1    May 15, 2008

Related U.S. Application Data

(60) Provisional application No. 60/865,701, filed on Nov. 14, 2006.

(51) Int. Cl.
*G06K 9/00*    (2006.01)
(52) U.S. Cl. ...................................................... 382/128
(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS

| | | | |
|---|---|---|---|
| 6,614,874 B2 | 9/2003 | Avinash | |
| 6,661,873 B2 | 12/2003 | Jabri et al. | |
| 6,754,298 B2 | 6/2004 | Fessler | |
| 6,792,072 B2 | 9/2004 | Avinash | |
| 6,816,572 B2 | 11/2004 | Jabri et al. | |
| 6,917,697 B2 | 7/2005 | Avinash et al. | |
| 7,068,826 B2 | 6/2006 | Jabri et al. | |
| 2004/0252873 A1* | 12/2004 | Avinash et al. | 382/132 |
| 2007/0196007 A1* | 8/2007 | Chen et al. | 382/131 |

* cited by examiner

*Primary Examiner* — Samir A Ahmed
*Assistant Examiner* — Atiba O Fitzpatrick

(57) ABSTRACT

A method and system for dual energy image registration is disclosed. In order to segment first and second images of a dual energy image pair, the first and second images are preprocessed to detect edges in the images. Gaussian pyramids, having multiple pyramid images corresponding to multiple pyramid levels, are generated for the first and second images. An initial optical flow value is initialized for a first pyramid level, and the optical flow value is sequentially updated for each pyramid level based on the corresponding pyramid images using an optimization function having a similarity measure and a regularizer. This results in a final optical flow value between the first and second images, and the first and second images are registered based on the final optical flow value.

25 Claims, 12 Drawing Sheets

METHOD AND SYSTEM FOR DUAL ENERGY IMAGE REGISTRATION

This application claims the benefit of U.S. Provisional Application No. 60/865,701 filed Nov. 14, 2006, the disclosure of which is herein incorporated by reference.

BACKGROUND OF THE INVENTION

The present invention relates to dual energy image registration, and more particularly, a variational method for dual energy image registration.

Conventional radiography (i.e., X-ray imaging) has been shown to have low sensitivity for detecting subtle details, such as lung nodules Accordingly, dual energy imaging can be used to evaluate such details. Dual energy imaging is a technique that acquires to images using low and high energy spectra, respectively. A sensor array is used to capture the rays that transverse through the subject. Since the attenuation coefficients of bone and soft tissue follow different functions of energy, the two images can be weighted and then subtracted to generate separate images for soft tissue and bone structure.

Well-known techniques for dual energy imaging include the Dual-Kilcolt (Peak) technique, the Single kV(p) Dual Filter technique, and the Sandwich Detector technique. The Single kV(p) Dual Filter and Sandwich Detector techniques acquire two images at one exposure by using some material to separate low and high energy image acquisition. These techniques are easy to implement, and any patient or anatomical motions have no effect on the results. However, due to material limitations and other factors, the separated images resulting from these techniques have low quality, and may have approximately three or four times as much noise as images resulting from the Dual-Kilcolt (Peak) technique. The Dual-Kilcolt (Peak) technique performs the entire image acquisition procedure at two different kV(p) levels (i.e., energy levels) in two sequential exposures. A time gap between the two exposures can range between 300 ms and 10 seconds, during which any motion of the patient or of anatomic structures within the patient may result in significant motion artifacts. Therefore, a registration method that is capable of compensating for any motion between the two images is needed.

Conventional image registration techniques cannot effectively register dual energy pairs for the following reasons. In X-ray images, all objects are transparent because X-rays are absorbed to different extents by different types of material as they pass through a patient. This means that one pixel in an image can contain portions of multiple anatomic structures, such as bones, the heart, the lungs, and other soft tissue. Therefore, each pixel may contain an arbitrary number of motions, such as heart motion and rib cage expansion due to aspiration. Conventional image registration techniques typically assume one motion per pixel. Furthermore, in dual energy imaging absorption, rates of bone and soft tissue do not relate linearly, and there is no objective mapping between intensity pairs for an image.

BRIEF SUMMARY OF THE INVENTION

The present invention provides a method for registering dual energy images, which determines an optical flow between the images of a dual energy image pair to compensate for movement between the images.

In one embodiment of the present invention, first and second images of a dual energy image pair are registered. The first and second images can be preprocessed to detect edges in the images. First and second Gaussian pyramids, each having multiple pyramid images corresponding to multiple pyramid levels, are generated for the first and second images, respectively. An optical flow value is initialized for a first pyramid level, and the optical flow value is sequentially updated for each pyramid level based on the corresponding pyramid images of the first and second Gaussian pyramids using an optimization function having a similarity measure and a regularizer. The optimization function can be an Euler-Lagrange equation having a term representing the similarity measure and a term representing the regularizer. The updating of the optical flow value for each pyramid level results in a final optical flow value between the first and second images. The first and second images are then registered based on the final optical flow value. The registered first and second images can then be weighted and subtracted to generate a soft tissue image and a bone image, These and other advantages of the invention will be apparent to those of ordinary skill in the art by reference to the following detailed description and the accompanying drawings.

DETAILED DESCRIPTION

Figure 1:
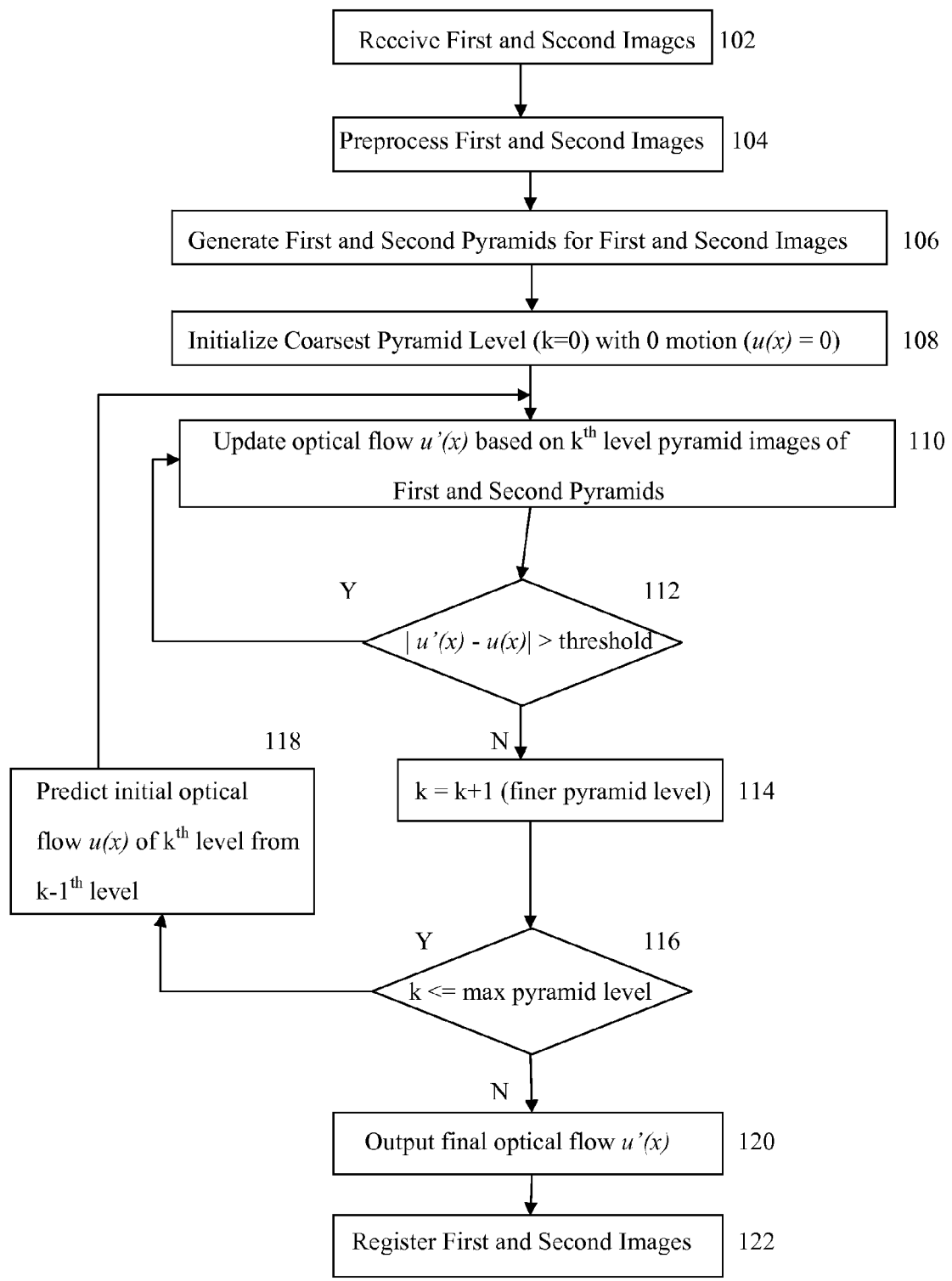
FIG. 1 illustrates a method for dual energy image registration according to an embodiment of the present invention.

The present invention is directed to a method for dual energy image registration, which registers a pair of X-ray images. Embodiments of the present invention are described herein to give a visual understanding of the lymph node segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to registering a dual energy image pair. Once the images of the dual energy image pair are registered to compensate for any motion between the images, the images can be weighted and subtracted to generate a soft tissue image and a bone image.

Since attenuation coefficients depend on the material through which x-rays travel during an image acquisition process, and because the human body consists of many different materials with different properties, it is difficult to perfectly discriminate soft tissue from bone in X-ray images. However, first and second images of a dual energy image pair can be expressed as a weighted linear combination of soft tissue and bone data:

$$i_1(x) = w_{s1}S(x) + w_{b1}B(x)$$

$$i_2(x) = w_{s2}S(x) + w_{b2}B(x)$$

Here, x denotes a 2D vector, $i_1(x)$ the first image, and $i_2(x)$ the second image. The weights $w_{s1}$, $w_{s2}$, $w_{b1}$, and $w_{b2}$ are positive, and $S(x)$ and $B(x)$ are the unknown soft tissue and bone images, respectively. The resulting linear system of equations can be solved by rewriting the system into a matrix form:

$$W \begin{pmatrix} S(x) \\ B(x) \end{pmatrix} = \begin{pmatrix} w_{s1} & w_{b1} \\ w_{s2} & w_{b2} \end{pmatrix} \begin{pmatrix} S(x) \\ B(x) \end{pmatrix} = \begin{pmatrix} i_1(x) \\ i_2(x) \end{pmatrix}.$$

Then, $S(x)$ and $B(x)$ can be calculated by calculating the inverse of W:

$$\begin{pmatrix} S(x) \\ B(x) \end{pmatrix} = W^{-1} \begin{pmatrix} i_1(x) \\ i_2(x) \end{pmatrix} \quad (1)$$

$$= \begin{pmatrix} \frac{w_{b2}}{w_{s1}w_{b2} - w_{b1}w_{s2}} & -\frac{w_{b1}}{w_{s1}w_{b3} - w_{b1}w_{s2}} \\ -\frac{w_{s2}}{w_{s1}w_{b2} - w_{b1}w_{s2}} & \frac{w_{s1}}{w_{s1}w_{b2} - w_{b1}w_{s1}} \end{pmatrix} \begin{pmatrix} i_1(x) \\ i_2(x) \end{pmatrix}.$$

Assuming that there exists a single motion per pixel in the second image, the system of equations can be expressed as:

$$i_1(x) = w_{s1}S(x) + w_{b1}B(x)$$

$$i_2(x) = w_{s2}S(x + u(x)) + w_{b2}B(x + u(x)), u: \Re^2 \to \Re^2$$

where $u(x)$ is an optical flow that represents the motion in the second image relative to the first image. This system of equations cannot be re-written as a linear system of equations. In this case, registration can be used to deform the second image using the inverse mapping of $u(x)$, which yields:

$$i_2(x) = w_{s2}S(x) + w_{b2}B(x) = i_2(x - u(x)), \quad (2)$$

and results in the same linear system of equations as described above. Accordingly, a registration method according to an embodiment of the present invention determines an optimal optical flow $u(x)$ for registering the second image to the first image. Once the optical flow $u(x)$ is determined via the registration method, the soft tissues and bone images can be determined by solving the linear system of equations.

The simplification of the problem does not hold when both soft tissue and bone images are non-rigidly deformed in the second image. In this case, if $u_s(x)$ denotes a motion applied to the soft tissue image and $u_b(x)$ denotes the motion of the bone image, the image formation can be expressed as:

$$i_1(x) = w_{s1}S(x) + w_{b1}B(x)$$

$$i_2(x) = w_{s2}S(x + u_s(x)) + w_{b2}B(x + u_b(x)), u_s, u_b: \Re^2 \to \Re^2$$

This system of equation cannot be easily solved because there are two functions which are not only unknown, but also nested in the equation. If both $u_s(x)$ and $u_b(x)$ were known it would still be impossible to deform the unknown functions $S(x)$ and $B(x)$.

FIG. 1 illustrates a method for dual energy image registration according to an embodiment of the present invention. The method of FIG. 1 registers first and second images of a dual energy image set to compensate for any motion between the first and second images. The method registers the first and second images by determining an optical flow value (x) which represents motion in the second image relative to the first image.

At step 102, the first and second images are received. The first and second images are X-ray images acquired at low and high energy levels, respectively. The first and second images can be received via an image acquisition device, such as an X-ray imaging device. The first and second images may be acquired by the image acquisition device performing a well-known dual energy imaging procedure, such as the Dual-Kilovolt (Peak) technique. It is also possible that the first and second images be acquired in advance of the method, stored in a storage or memory of a computer system performing the steps of the method, and received from the memory or storage of the computer system.

Figure 2:
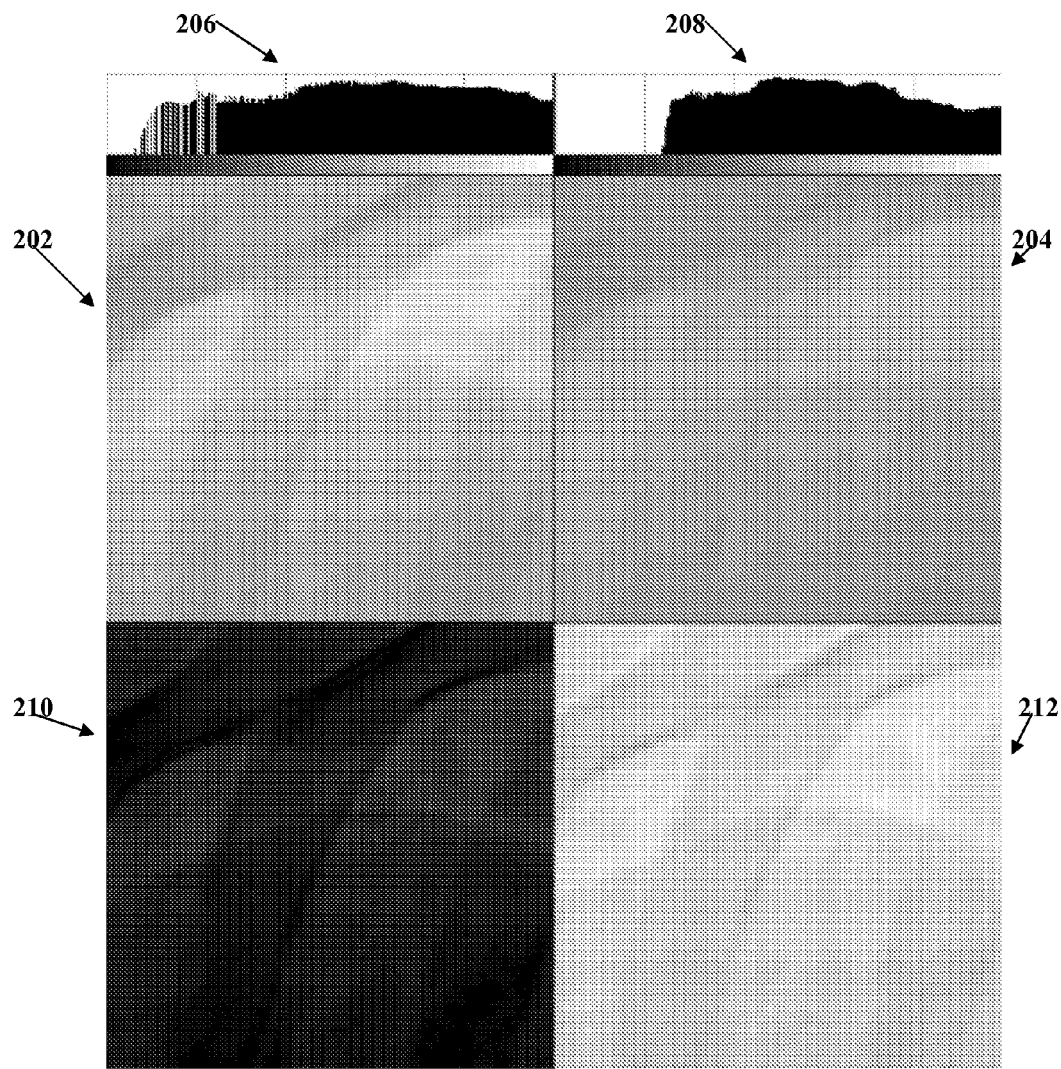
FIG. 2 illustrates a small crop of exemplary dual energy images.

At step 104, the first and second images are each preprocessed in order to detect edges in the first and second images. The edges detected in the first and second images are used in subsequent steps of the method to register the first and second images. In a set of dual energy images, since the first and second images were acquired at different energy levels, the intensity of the first and second images do not relate well to each other. FIG. 2 illustrates a small crop of dual energy images. Images 202 and 204 are first and second images, respectively. Image 206 is a log-histogram of the first image 202, and image 208 is a log-histogram of the second image 204. Image 210 shows a difference between the first and second images 202 and 204, and image 212 shows a ratio of the first and second images 202 and 204. As illustrated in FIG. 2, the intensities of the first and second images 202 and 204 do not relate well to each other since the first and second images 202 and 204 have different intensity distributions. Accordingly, the first and second images 202 and 204 cannot be accurately registered based by relating the intensities. Thus, the first and second images are preprocessed to make the images more comparable.

Figure 3A:
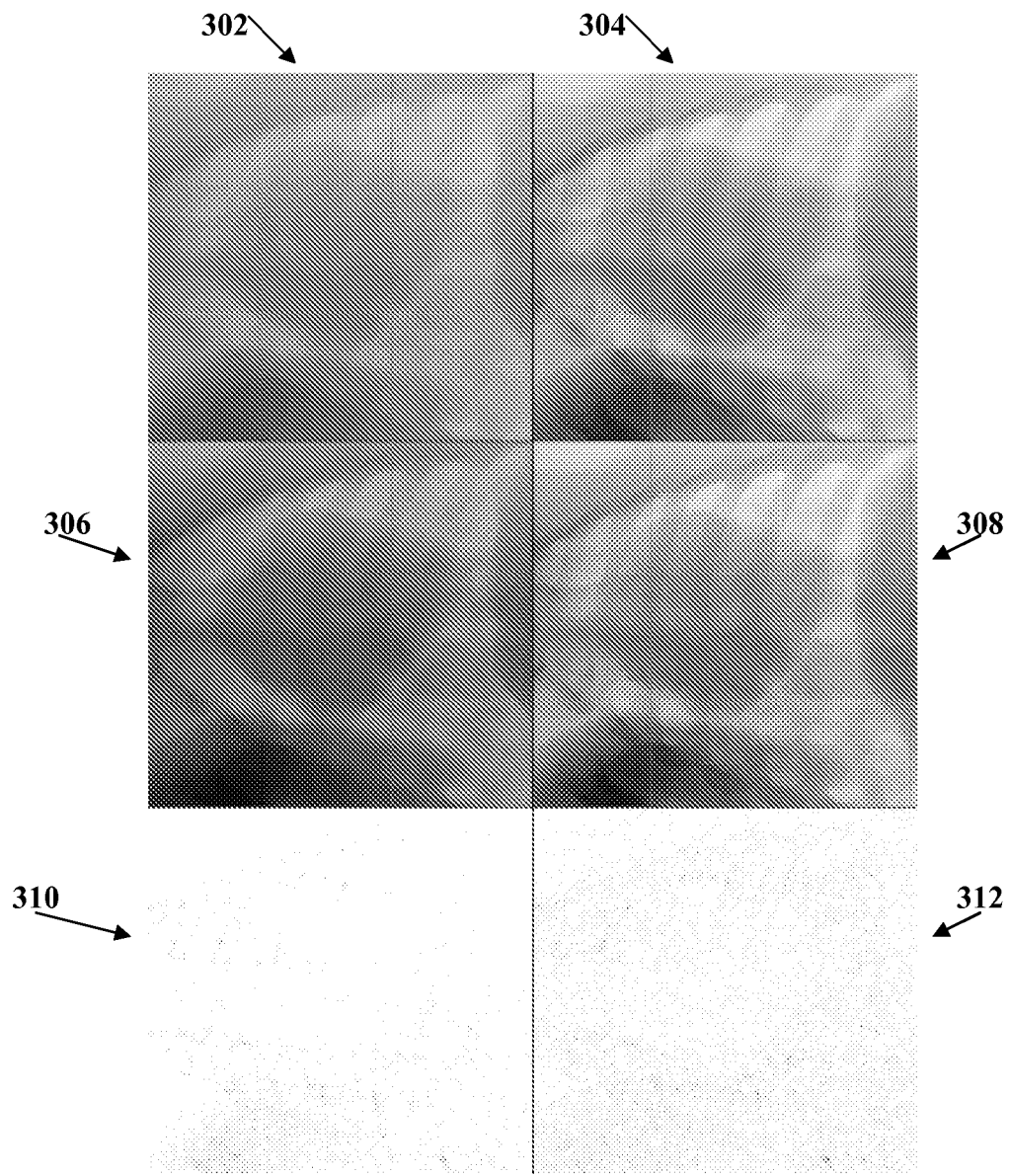
FIGS. 3A and 3B illustrate exemplary preprocessing results of various preprocessing methods according to various embodiments of the present invention.

Various preprocessing methods can be used in step 104 in order to make the first and second images more comparable. These methods include but are not limited to, normalized gradient magnitude, Harris corner detection, normalized Laplacian of Gaussian, binarized Laplacian of Gaussian, and various smoothing methods. These preprocessing techniques are described below while referring to FIGS. 3A and 3B, which illustrate exemplary preprocessing results of various preprocessing methods according to various embodiments of the present invention. In FIG. 3A, images 302 and 304 the first and second images, respectively, of the original dual energy set before any preprocessing.

Normalization. The normalization processing method scales the intensities of the first and second images to the same range using a linear function:

$$i_n(x) = \frac{i(x) - i_{min}}{i_{max} - i_{min}}.$$

This results in a normalized image pair. FIG. 3A shows the normalized images 306 and 308 of the first and second images 302 and 304, respectively.

Harris Corner Detection. In order to register important structures only, a well-known Harris corner detector can be used to detect the most distinct regions in the first and second images. However, the results of the Harris corner detector may be sparse because dual energy images may have few corners. Thus, this preprocessing method may be suited for landmark-based registration techniques. FIG. 3A illustrates images 310 and 312 resulting from processing the first and second images 302 and 304, respectively, with a Harris corner detector.

Figure 4:
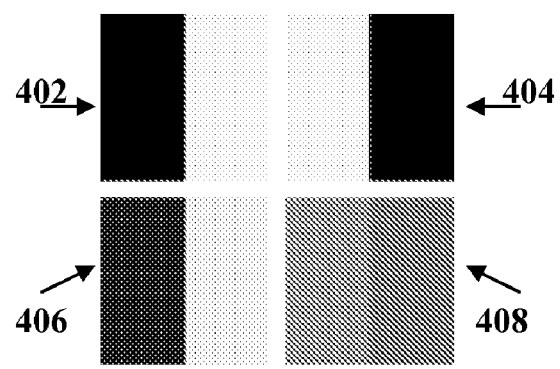
FIG. 4 illustrates exemplary first and second images with gray values that are linearly combined with different weights.

Normalized Gradient Magnitude. Because intensities cannot be easily used for the registration, as described above, a normalized gradient magnitude method, according to an embodiment of the present invention, transfers the first and second images to the gradient domain before comparing the first and second images. Hence, only the relation between neighboring pixels is compared, but not the absolute intensities of the pixels. Although it is possible to match the gradient vectors directly by taking the Euclidean norm of the difference vector, the gradient magnitude can be used instead to save computation time. Because of the linear combination of soft tissue and bone, a problem still may exist that the gradient magnitudes do not directly relate to each other. This can be explained by an example shown in FIG. 4. FIG. 4 illustrates exemplary first and second images 402 and 404 with gray values that are linearly combined with different weights. As illustrated in FIG. 4, when two images 402 and 404 with different gray values are linearly combined with different weights, the resulting gradient becomes different resulting in two different weight additions 406 and 408, respectively.

Figure 3B:
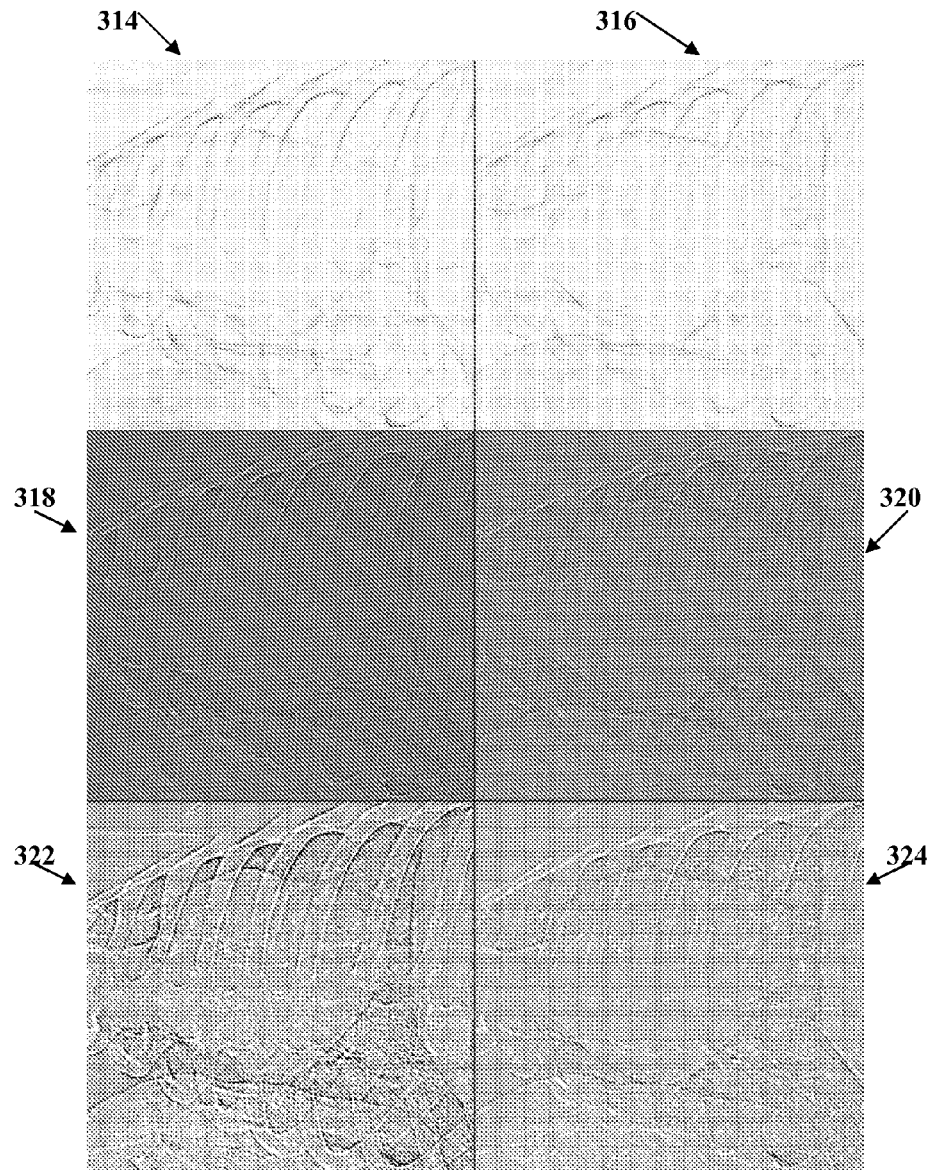

Normalization, as described above, can reduce the effect shown in FIG. 4 to some extent because the gradient magnitudes have a more similar maximum and minimum value than the intensities have. This results in a normalized gradient magnitude image for each of the first and second images. FIG. 3B shows normalized gradient magnitude images 314 and 316 for the first and second images 302 and 304, respectively.

Despite the above described problem, the normalized gradient magnitude preprocessing method may be advantageous in that features to be matched become more distinct with respect to their surroundings. Homogenous regions have no gradient and are therefore black in the gradient image, no matter which color the homogeneous region had before preprocessing. Accordingly, a smoothness constraint propagates flow information into those homogenous regions. Although this could cause ambiguities, only regions in which the flow can be estimated are regions with distinct edges, and the only information lost is the concrete value of the intensity in a specified region. Since in dual energy imaging, these intensity values do not relate linearly, this information can be dropped in order to prevent mismatches.

Normalized Laplacian of Gaussian. In order to make registration more accurate, the first and second methods can be preprocessed by filtering each image with a Laplacian-of-Gaussian (LoG) filter. The Laplacian operator is the divergence of the gradient of a scalar function, and thus yields another scalar field which can be used to measure the second derivative of an image. Since the noise in the gradient of an image is greatly enhanced, the noise in a measure of the second derivative is usually much higher. Therefore, a convolution kernel of the LoG incorporates Gaussian smoothing with variance σ. The resulting kernel function can be expressed as follows:

$$LoG(x, y) = -\frac{1}{\pi\sigma^4}\left[1 - \frac{x^2 + y^2}{2\sigma^2}\right]e^{-\frac{x^2+y^2}{2\sigma^2}}.$$

Figure 5:
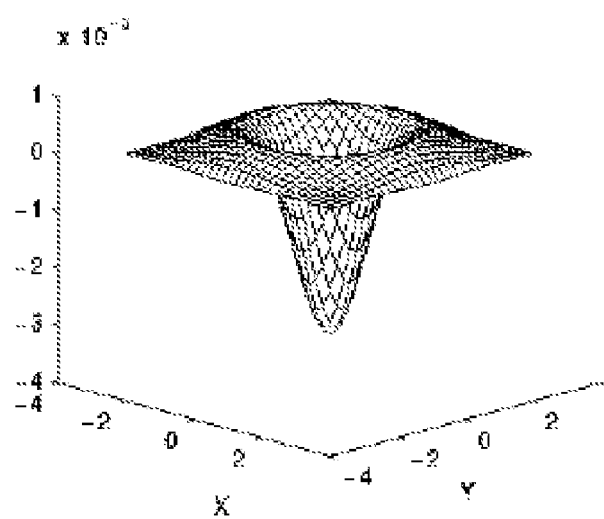
FIG. 5 illustrates a three-dimensional visualization of a LoG filter.

Here, σ is the variance of the Gaussian function. FIG. 5 illustrates a three-dimensional visualization of the LoG filter.

The LoG filter may be advantageous because the sign of the second derivative is incorporated into the measure that can be seen as the "magnitude" of the curvature. As a result, the registration executed more accurately because the direction and the zero-crossings of the curvature can be utilized. Normalizing the LoG-filtered results can help to make matching more efficient. FIG. 3B shows normalized LoG-filtered images 318 and 320 of the first and second images 302 and 304, respectively.

Binarized Laplacian Gaussian. In all of the above described preprocessing methods, the preprocessed images still do not perfectly relate with respect to their intensities. The binarized Laplacian Gaussian preprocessing method overcomes this problem by binarizing both of the first and second images according to different functions under the assumption that the existence of an edge in then first image allows for the conclusion that this edge will also exist in the second image, no matter what the strength of the edge may be.

In order to implement the binarized Laplacian Gaussian preprocessing method, a threshold for the binarization must be determined for both images. According to an embodiment of the present invention, instead of a strict threshold, it is possible to define a sigmoidal function:

$$S_{thresh}(x) := \frac{1}{1 + e^{-s(S(x)-c)}},$$

such that a smooth transition exists between the two values. Here, s can be interpreted as the sharpness of the transition, and c as its center. In order to preserve the sign of the curvature, the LoG result is split into two images, one containing the positive values and one containing all negative values. Then, a normalized histogram of each image is generated. To specify the point of transition between edge and non-edge, the integral of the histogram is used to determine the value for which the following equation hold:

$$s = \int_0^\lambda H_{|\nabla i(x)|}(z)dz,$$

where $H_{|\nabla i(x)|}$ denotes the normalized histogram of the gradient of image i(x), and z is the variable for the intensities. The idea of this equation is that a given percentage of the pixels should be considered as edges, while the remaining pixels are non-edges. After binarization of the positive and negative valued images, both are combined so that the resulting image can have three different values: positive edge, negative edge, and no edge.

Figure 6:
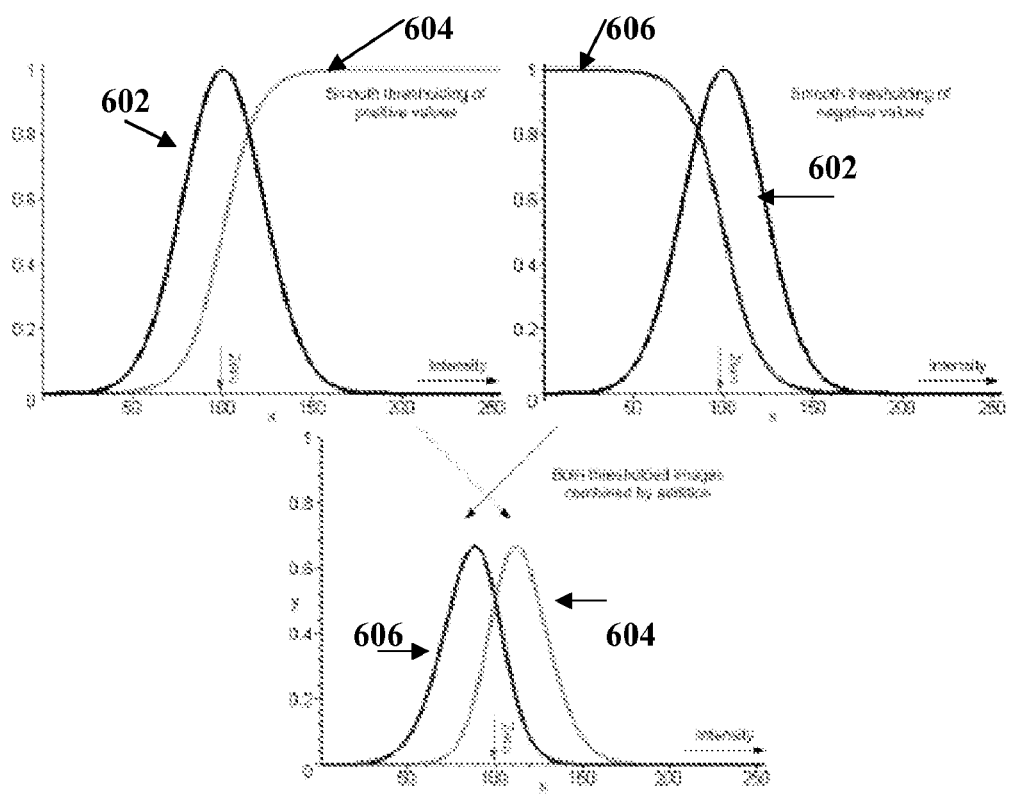
FIG. 6 illustrates exemplary histograms used to binarize LoG-filter results.

FIG. 6 illustrates exemplary histograms used to binarize LoG-filter results. As illustrated in FIG. 6, curve 602 is a histogram if a LoG-filter result which has been created using 255 bins. Curve 604 is the smooth threshold for positive values, and curve 606 is the smooth threshold for negative values. The thresholding can be understood as multiplication with the histogram 602. All bins to the left of the zero-marker have negative values in the LoG result, while all bins to the right of the zero-marker have positive values in the LoG result. After the two smooth thresholds 602 and 606 have been applied, the results are added (curve 608) so that both negative and positive values preserve their sign.

In the binarized LoG preprocessing method described above two parameters are necessary for binarization: the smoothness of the transition and the percentage of pixels which will be considered as edges. FIG. 3B shows images 322 and 324 resulting from preprocessing the first and second images 302 and 304, respectively, using the binarized LoG preprocessing method.

Figure 7:
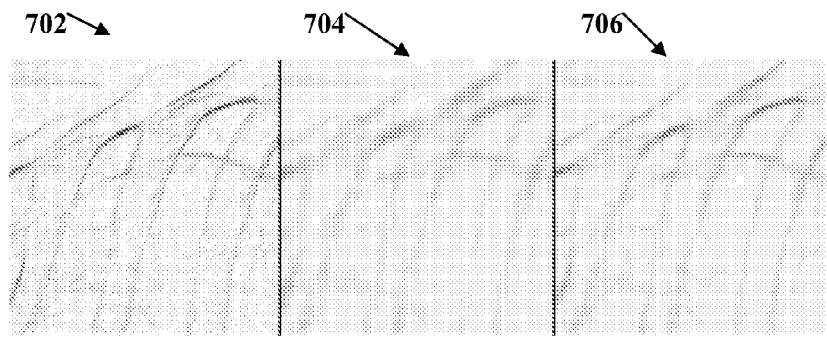
FIG. 7 smoothing of a noisy gradient image.

Smoothing. Although the LoG-filter already smoothes the resulting images isotropically, in both LoG preprocessing methods described above, noise can be enhanced in the gradient images. Accordingly, an additional smoothing pre-processing method can be used to denoise the images. FIG. 7 illustrates smoothing of a noisy gradient image 702.

One possible smoothing method is Gaussian filtering. A Gaussian filter is an averaging filter with a focus on the center of the kernel. A Gaussian filter can be referred to as a low pass filter in the signal processing sense, and smoothes an image equally in all directions. As a result, the image may lose contrast and the edges of the image may blur. Since the edges are important features for registrations a Gaussian filter may decrease the accuracy of the registration result. As illustrated in FIG. 7, image 704 shows a result of smoothing the gradient image 702 using a Gaussian filter.

Another possible smoothing method is filtering the image with a nonlinear isotropic diffusion filter. Such a filter guides the direction of the smoothing by calculating edge orientation. In homogenous regions, the smoothing is rotationally invariant, but around edges, the nonlinear isotropic diffusion filter only smoothes in the direction of the edge. As illustrated in FIG. 7, image 706 shows a result of smoothing the gradient image 702 using a nonlinear isotropic diffusion filter.

Various preprocessing methods are described above for performing the preprocessing step (104) of the method of FIG. 1. It is to be understood that multiple preprocessing methods may be used in combination to preprocess the first and second images. For example, in an advantageous embodiment of the present invention, the first and second images can first be preprocessed by the normalized gradient magnitude preprocessing method or the normalized LoG preprocessing method, then preprocessed by the binarized LoG preprocessing method, and finally smoothed using a nonlinear isotropic diffusion filter.

Returning to FIG. 1, at step 106, first and second pyramids are generated for the first and second images, respectively. According to an embodiment of the present invention, the first and second pyramids are Gaussian pyramids. Gaussian pyramids are well known, and can be generated from an image using well-known pyramid decomposition methods. Each of the Gaussian pyramids is made up of multiple pyramid images which correspond to different resolution levels. The different resolution levels are referred to herein as pyramid levels. The pyramid images corresponding to the pyramid levels range from coarse to fine representations of the first and second images.

In order to generate the first and second Gaussian pyramids, pyramid parameters including the number of pyramid levels and a factor between each level of the pyramids must be defined. In order to define these parameters, a scale parameter $\sigma_0$ is specified, which should approximate the largest motion that will occur in the images. A scale decay rate $\eta$ is defined which is used to get the scale $\sigma_n$ of pyramid level n by evaluating $\sigma_n = \eta^n \sigma_0$. In scale space, $\sigma_n$ is defined as the standard deviation of a Gaussian filter. To transfer this technique to the pyramids, a down-sampling factor must be selected. $\sigma_n$ can be interpreted as a parameter for the maximum motion of a fixed scale in scale space. Accordingly, in order to speed up convergence by using a pyramid, the down-sampling factor for each level of a pyramid can be defined as $$\frac{1}{\sigma_n}.$$

This means that the maximum motion in scale n corresponds to a motion of a single pixel on the pyramid level n After the pyramid parameters have been set, the first and second Gaussian pyramids are generated. In a possible implementation, the pyramids are generated by iteratively down-sampling the current pyramid level to the next one. In another possible implementation, the pyramid generation method always down-samples from the lowest level (with the original resolution). To actually down-sample the first and second images, each of the first and second images is filtered with a Gaussian filter with $\sigma_n$ as the standard deviation. A block size of the kernel can be selected to be $3\sigma_n$, since a $3\sigma_n$ neighborhood of a Gaussian distribution contains 99.7 percent of the area under the Gaussian. To save computation time, instead of filtering the whole image with the Gaussian, it is possible to only evaluate the Gaussian at each pixel of the smaller image by calculating the appropriate center of the Gaussian in the larger image by using the scale factor of $$\frac{1}{\sigma_n}.$$

Returning to FIG. 1, at step 108, the coarsest pyramid level (k=0) is initialized with zero motion (u(x)=0). This step sets an initial value for the optical flow between the pyramid images corresponding to the coarsest pyramid level of the first and second pyramids. In subsequent steps, this optical flow value will be updated based on the pyramid images corresponding to each pyramid level of the first and second pyramids in order to determine a final optical flow value between the first and second images. According to an embodiment of the present invention, the initial value of the optical flow can be set to zero, based on the assumption that the optical flow is small in the coarsest pyramid level, and the initial value of zero is near the actual optical flow value for the coarsest pyramid level.

At step 110, the optical flow (x) is updated based on the pyramid images corresponding to the current pyramid level of the first and second pyramids resulting in an updated optical flow u'(x). The optical flow is updated by calculating an update value based on an optimization function having a similarity measure term and a regularization term. The similarity measure term is a measure of similarity of the pyramid images corresponding to the current pyramid level of first and second pyramids, based on edges detected in the preprocessing step. The regularization term evaluates smoothness of the motion estimation. The optimization function can be implemented as an Euler-Lagrange equation having Lagrange multipliers for the similarity measure and regularization terms. This optimization function can be optimized at each pyramid level by iteratively updating the optical flow based on the variational gradients of the Lagrange multipliers representing the similarity measure and regularization terms.

Figure 8:
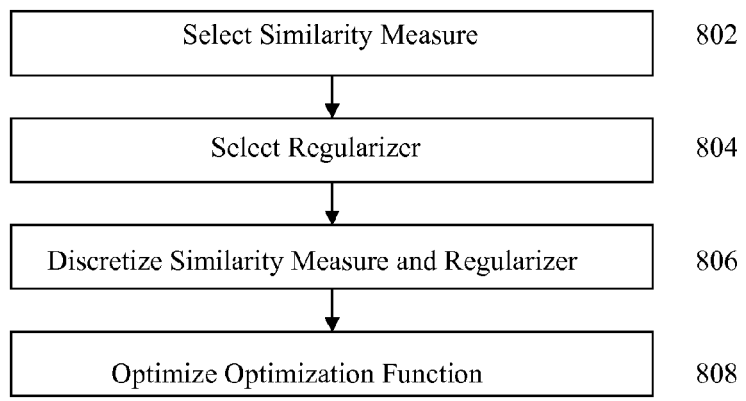
FIG. 8 illustrates a method for updating optical flow for pyramid images corresponding to a pyramid level of the first and second pyramid images, according to an embodiment of the present invention.

FIG. 8 illustrates a method for updating the optical flow for pyramid images corresponding to a pyramid level of the first and second pyramid images, according to an embodiment of the present invention. Accordingly, the method of FIG. 8 can be used to implement step 110 of FIG. 1.

At step 802, a similarity measure is selected for the optimization function. The similarity measure evaluates a quality of the match between the two pyramid images for the value of the optical flow. According to an embodiment of the present invention, the similarity measure can be one of Sum of Squared Differences (SSD), Cross Correlation (CC), and Mutual Information (MI). An energy functional for SSD can be expressed as:

$$E_{SSD}(i_1(x), i_2(x), u(x)) = \int_\Omega L_{SSD}(x, u(x)) dx$$
$$= \int_\Omega (i_1(x) - i_2(x + u(x)))^2 dx, SSD: \mathbb{R}^2 \to \mathbb{R}$$

Only $L_{SSD}(x,u(x))$ needs to be derived with respect to $u(x)$ in order to get the corresponding Euler-Lagrange equation which yields a partial differential equation (PDE) to be solved to determine an update based on the SSD similarity measure. Therefore, $u(x)$ can be treated as a scalar variable, and by applying the chain rule, the variational gradient can be expressed as:

$$\nabla L_{SSD}(i_1(x), i_2(x), u(x)) = 2(i_1(x) - i_2(x+u(x)))\nabla i_2(x+u(x)).$$

The variational derivates for CC and MI similarity measures can be expressed as:

$$\nabla L_{MI}(i_1, i_2, u(x)) = \qquad (3)$$
$$G_\beta * \frac{1}{|\Omega|}\left(\frac{\partial_2 P((i_1, i_2), u(x))}{P((i_1, i_2), u(x))} - \frac{p'(i_2, u(x))}{p(i_2, u(x))}\right)\nabla i_2(x + u(x))$$

$$\nabla L_{CC}(i_1, i_2, u(x)) = \qquad (4)$$
$$-\frac{2}{|\Omega|}\left[\frac{v_{1,2}(u(x))}{v_2(u(x))}\left(\frac{i_1 - \mu_1}{v_1}\right) - \frac{v_{1,2}^2(u(x))}{v_1 v_2(u(x))}\left(\frac{i_2 - \mu_2(u(x))}{v_2(u(x))}\right)\right]\nabla i_2(x + u(x)).$$

In the above equations, $i_1$ and $i_2$ denote concrete intensity pairs and not the whole image functions. Furthermore, P is the joint pdf and p is the pdf with respect to the intensity distribution of the second image, $\mu$ is the mean, $G_\beta*$ denotes convolution with respect to a Gaussian of sigma $\beta$ (the Parzen density estimate). $\partial_2$ denotes the derivative with respect to the second variable ($i_2$) and p' denotes the one dimensional derivative, while $|\Omega|$ is the number of pixels of one image. The CC and MI similarity measures both rely on image statistics and can be evaluated locally or globally by estimating the image statistics either for the whole image, or for a neighborhood around each pixel to be matched.

At step 804, a regularizer is selected for the optimization function. Since any additional constraints for the optimization function (i.e., the energy functional) are added as Lagrange Multipliers, the derivation with respect to the unknown function can be performed separately for each regularizer. Therefore this method can be implemented is a modular way such that any combination of similarity measure and regularizer can be selected at runtime.

In one possible implementation, a Laplacian regularizer can be selected. The Laplacian regularizer can be express as:

$$L_{reg}(u)\alpha \int_\Omega \|\nabla u(x)\|_2^2 dx.$$

The Laplacian regularizer creates large values if the Euclidean norm of the gradient of the optical flow becomes large. Accordingly, this regularizer punishes any non-smooth regions in the motion estimate. The factor $\alpha$ can be interpreted as the strength of the regularizer. In order to get the variational gradient of the regularizer, the derivate with respect to $u(x)$ must be calculated. The squared norm of the Laplacian can be expressed as:

$$L_{reg}(u(x)) = \alpha \int_\Omega \sum_{i=1}^n \left(\frac{\partial}{\partial x_i} u(x)\right)^2 dx.$$

For the flow-field case, this can be expressed as:

$$L_{reg}(u(x)) = \alpha \int_\Omega \left(\frac{\partial}{\partial x} u_1(x)\right)^2 + \left(\frac{\partial}{\partial y} u_2(x)\right)^2 dx.$$

The variational gradient of this term can be obtained by evaluating the Euler-Lagrange equation for $L_{reg}(.)$:

$$0 = \frac{\partial}{\partial u} L_{reg}(.) - \frac{d}{dx}\frac{\partial}{\partial u_x} L_{reg}(.) - \frac{d}{dy}\frac{\partial}{\partial u_y} L_{reg}(.)$$
$$= 0 - \frac{\partial}{\partial x} 2\left(\frac{\partial}{\partial x} u_1(x)\right) - \frac{\partial}{\partial y} 2\left(\frac{\partial}{\partial y} w_2(x)\right)$$
$$= 2\left(\left(\frac{\partial^2}{\partial x^2} u_1(x)\right) + \left(\frac{\partial^2}{\partial y^2} u_2(x)\right)\right).$$

Division by 2 removes the constant, and the rest of the term can be referred to as the divergence of a gradient field, which is also called the Laplacian. Thus, the resulting variational gradient can be expressed as:

$$\nabla L_{reg}(u(x)) = \alpha \Delta u(x).$$

As described above, the constant $\alpha$ can be interpreted as the strength of the regularizer, and is used to weight the importance of the regularizer with respect to other terms (i.e., the similarity measure term) in the optimization function.

In another possible implementation, a Nagel-Enkelmann-Regularizer can be used as the regularizer. Such a regularizer may be highly generic, since it only uses edge information of the image, As known in the art, the variational gradient of a Nagel-Engelmann-Regularizer can be expressed as:

$$\nabla L_{reg}(u(x)) = c\Delta(D(\nabla i_1(x))\nabla u(x)).$$

Once the similarity measure and the regularization terms are selected in steps 802 and 804, the optimization function is generated by adding the selected similarity measure term to the selected regularization term.

At step 806, the similarity measure and the regularization terms are discretized so that they can be evaluated by a computer system. This discretization step replaces operators with discrete versions and linearizes any non-linear terms. Various methods can be used to discretize the similarity measure and regularization terms including, but not limited to, the gradient operator, the divergence operator, the Laplace operator, and approximation of probability density functions. These methods are described below.

Gradient Operator. Calculating the gradient of a two-dimensional function, such as an image, involves determining the change of the function from one location to the next. Since the function has two dimensions, the first derivative with respect to each coordinate is calculated, resulting in a vector field. This vector field can be stored in two separate images, one for the gradient in the x-direction and the other for the gradient in the y-direction.

Figure 9:
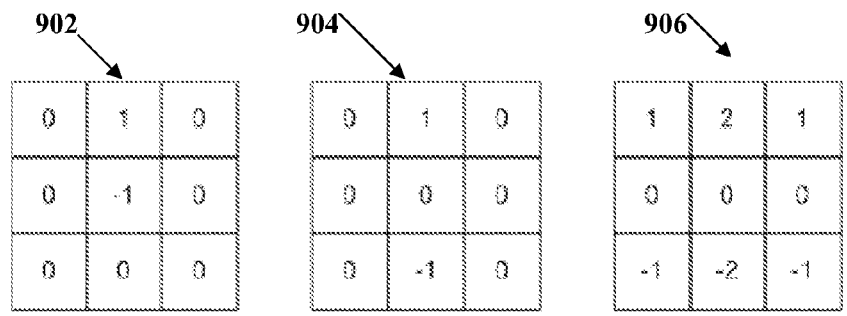
FIG. 9 illustrates three exemplary gradient operators.

FIG. 9 illustrates three exemplary gradient operators. The gradient in one coordinate direction can be calculated by a first operator 902, which calculates the difference between each pixel and its neighbor in one direction. However, this result is not invariant to orthogonal transformations. Accordingly, in a central difference operator 904 can be used to calculate the gradient. The central difference operator 904 calculates the difference between the next and previous pixel in a specified direction, while the actual value of the pixel is skipped. However, both of the operators 902 and 904 are sensitive to noise because in regions with small intensity changes, the gradient may be determined by noise in the image. Since any discretization of the actual gradient is an approximation, a Sobel operator 906 can be used. The Sobel operator 906 takes into account not only central differences, but also two neighboring central differences, which are weighted by a predefined factor. Accordingly, the Sobel operator 102 calculates a local average gradient in order to smooth out some of the noise.

Divergence Operator. The divergence can be interpreted as some kind of gradient magnitude of a vector. One possible way to define the divergence is the dot product between, the gradient operator and the vector field depending on the vector x:

$$\Delta f(x) = \begin{pmatrix} \frac{\partial}{\partial x} \\ \vdots \\ \frac{\partial}{\partial x_n} \end{pmatrix} \begin{pmatrix} f_{x1} \\ \vdots \\ f_{xn} \end{pmatrix} = \sum_{i=1}^{n} \frac{\partial f_{xi}}{\partial x_i}.$$

Figure 10:
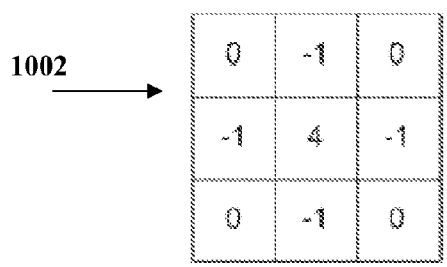
FIG. 10 illustrates an exemplary discrete divergence operator.

The resulting scalar field can be obtained by calculating the sum of the directional gradients for each coordinate. FIG. 10 illustrates a discrete divergence operator 1002 based on the central difference implementation.

Laplace Operator. The Laplace operator is defined as the divergence of the gradient of a given scalar-valued function. Thus, the Laplace operator discretization is equivalent to the divergence discretization applied to a gradient field, and not an arbitrary vector field. Accordingly, the discrete divergence operator 1002 of FIG. 10 becomes a Laplace operator if applied to a gradient field.

Approximation of Probability Density Functions. The CC and MI similarity measures are based on the probability density function (pdf) and the joint probability density function (jpdf) of the images. Therefore, in order to discretize these similarity measures, the pdf and jpdf must be estimated. This estimation may be necessary for these similarity measures because the number of pixels inside the image may not be sufficient to fully describe the probability of each intensity occurring in the image. Furthermore, the pdf has to be discretized if the image intensities are floating point variables (which may be the case when high accuracy image registrations are needed).

A possible method for estimating the pdf utilizes a Parzen Density Estimator. In this case, a histogram with a predefined number of bins is obtained for the image. However, in a case with an unlimited number of bins, the histogram of a floating point image would contain only one entry for each intensity occurring in the image, which would result in the same probability for each intensity. Since this pdf would certainly not represent the actual statistics of the image, the number of bins should be small enough that the resulting histogram is not too sparse. Accordingly, the number of bins can be determined based on sample images. A Gaussian filter is then applied on the histogram in order to estimate the pdf. Since similar intensities cannot be strictly distinguished from each other, each probability of one single intensity also affects neighboring intensities.

The jpdf can be estimated using the same method with a two-dimensional pdf. The joint histogram can be built by counting each pair of intensities over all pixel locations of the two images. The resulting two-dimensional map is then filtering and normalized as described above.

Once the pdf and jpdf are estimated, other statistics, such as mean, variance, and covariance can be calculated by interpreting the involved integrals as sums over all of the bins, Accordingly, the variance, for example, can be expressed as:

$$\text{var}(i(x)) = \left( \sum_{n=1}^{N} i_n^2 P(i_n) \right) - \mu_{i(x)}^2,$$

Where N is the number of bins of the normalized histogram, $p(i_n)$ is the probability of the intensity in bin n, and $\mu_i(x)$ is the mean of the image.

As described above, various discretization methods can be used to discretize the Euler-Lagrange equations (i.e., the variational gradients of the similarity measure and regularization terms). The statistical measure cannot be written in an explicit formula because mean, variance, and the pdf estimates must be calculated first. Once this is performed, the results can be directly inserted into the above described variational gradients (e.g., equations 3 and 4). In the discretization of the SSD similarity measure and the Nagel-Enkelmann regularizer, because the second warped image is highly nonlinear (the flow u(x) is nested in $i_2(x+u(x))$), this part of the equation cannot be used in a fully implicit linear method. Thus, this part of the equation can be linearized by a first order Taylor expansion so that $i_2(x)$ in the iterative scheme at iteration k evaluates as:

$$i_2(x+u(x)^{k+1}) \approx i_2(x+u(x)^{k+1} - u(x)^k \nabla_2(x+u(x)^k),$$

where $u(x)^k$ denotes the flow at iteration k. Apart from this Taylor expansion, the continuous equations can be discretized by directly applying the discretization methods described above.

Returning to FIG. 8, at step 808, the optimization function including the similarity measure and regularization terms is optimized to find the optical flow between the pyramid images of the current pyramid level. The Euler-Lagrange equation derived for obtaining the optical flow between the images can be solved as an initial value problem. Accordingly, an update value is determined based on the variational gradient of the Euler-Lagrange equation, and the update value is added to the initial value u(x) resulting in the updated optical flow value u'(x). As described above, the initial value of the optical flow can be set to zero for the first pyramid level. For subsequent pyramid levels, the initial value of the optical flow u(x) can be the value of the updated value u'(x) resulting from optimizing the function for the previous pyramid level.

In order to determine the update, an artificial variable t can be introduced, and the initial value problem can be defined as follows:

$$\begin{cases} \dfrac{du}{dt} = -(\nabla L_{sim} + \nabla L_{reg}) \\ u_{t=0}(x) = u_0(x) \end{cases} \quad (5)$$

This PDE-based approach to determine a function which minimizes the energy works as a variational gradient descent method to optimize the optical flow for the pyramid images of the current pyramid level. When dt is sufficiently small, the result of this optimization method is an update rule for u(x) with $$\dfrac{du}{dt}$$

being the amount of change applied to u(x).

When the Euler-Lagrange equation has been discretized (and linearized, if necessary), in every iteration, the new $u_{i+1}(x)$ can be calculated by evaluating the last iteration and then multiplying the result with an appropriate step size before adding it to the previous $u_i(x)$, according to equation 7. This method can also be understood as solving a linear system of equations, although it is not put into actual matrices of the form Ax=b in the implementation. Instead, each (discrete) position of the optical flow can be directly updated in a nested for-loop. The discrete Euler-Lagrange equation generates the matrix A, and the unknown values are stored in x, while b contains known boundary values.

According to a possible implementation, the optimization method described above may further include a momentum term in the equation for updating the optical flow. The momentum term speeds changes the optical flow by adding the change of the last iteration, weighted with a constant factor β(here $\Delta_i$ does not denote divergence but the numerical change of u(x)):

$$u_{i+1}(x) = u_i(x) + \Delta_i u(x) + \beta \Delta_{i-1} u(x).$$

Returning to FIG. 1, at step 112, it is determined whether a difference between the updated optical flow value u'(x) and the initial optical flow value u(x) is greater than a threshold. If the difference between the updated optical flow value u'(x) and the initial optical flow value u(x) is greater than the threshold, the optical flow is not yet optimized for the current pyramid level, and the method returns to step 110. In this case, the optical flow between the pyramid images corresponding to the current pyramid level is iteratively updated until the optical flow value for the current pyramid level converged. If the difference between the updated optical flow value u'(x) and the initial optical flow value u(x) is not greater than the threshold, the optical flow value has converged for the current pyramid level, and the method proceed to step 114.

At step 114, the method proceeds to a next (finer) pyramid level, such that the next pyramid level becomes the current pyramid level (k=k+1). At step 116, it is determined if the current pyramid level is less than or equal to a maximum pyramid level. If the current pyramid level is less than or equal to the maximum pyramid level, not all of the pyramid levels have been processed, and the method proceeds to step 118. If the current pyramid level is greater than the maximum pyramid level, the all of the pyramid levels have been processed, and the method proceeds to step 120.

At step 118, the initial optical flow u(x) for the current pyramid level is predicted from the final updated optical flow u'(x) of the previous pyramid level. Accordingly, the final optical flow u'(x) from the previous pyramid level is set as the initial value for the current pyramid level The method then returns to step 110, and updates this initial value for the current pyramid level. Accordingly, the optical flow value is sequentially updated based on the pyramid images corresponding to each of the pyramid levels of the first and second pyramids from a coarsest level to a finest level.

At step 120, the final updated optical flow u'(x) is output as the optical flow between the first and second images At step 122, the first and second images are registered based on the final optical flow. The first and second images can be registered by deforming the second image resulting to compensate for motion between the first and second images. Once the first and second images of the dual energy image set are registered, they can be weighted and subtracted to generate a soft tissue image and a bone image.

Figure 11:
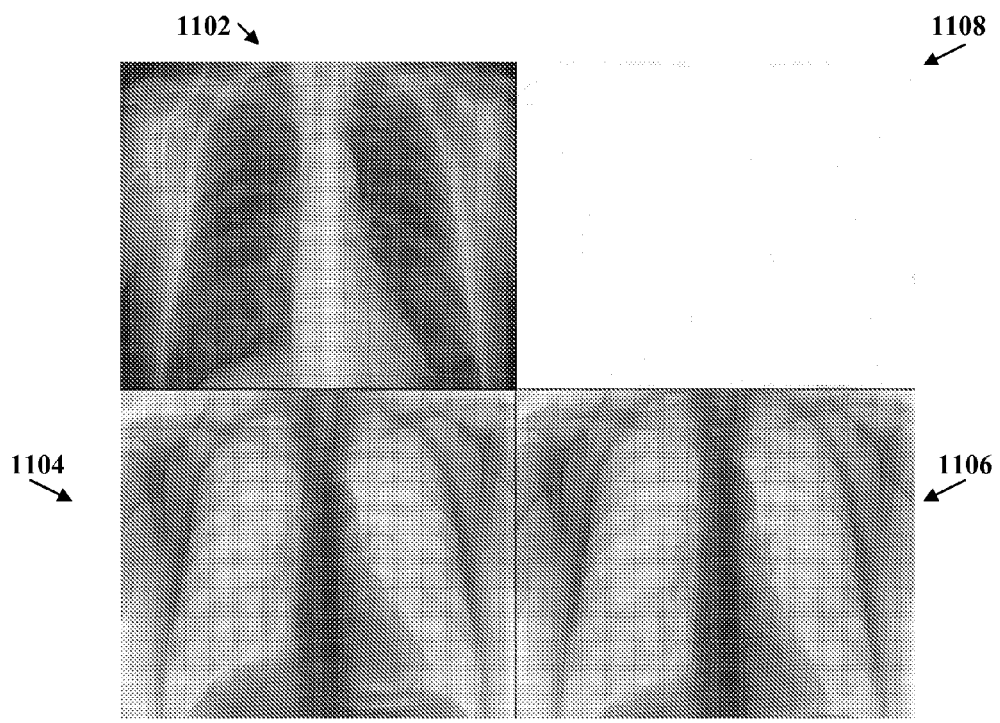
FIG. 11 illustrates exemplary registration results using a mutual information similarity measure according to an embodiment of the present invention.

FIG. 11 illustrates exemplary registration results using the MI similarity measure according to an embodiment of the present invention. In order to evaluate the performance of the above described methods, an artificial dual energy image pair was generated by warping a first image 1102 non-rigidly to create a second image 1104. The first and second images 1102 and 1104 were registered using the method described above with the MI similarity measure. Accordingly, the second image 1104 is registered to the first image 1102, resulting in the registered second image 1106. Image 1108 shows an absolute difference between the first image 1102 and the registered second image 1106. As shown in image 1108, since there is little visible absolute difference between image 1102 and the registered second image 1106, the registration is successful.

Figure 12:
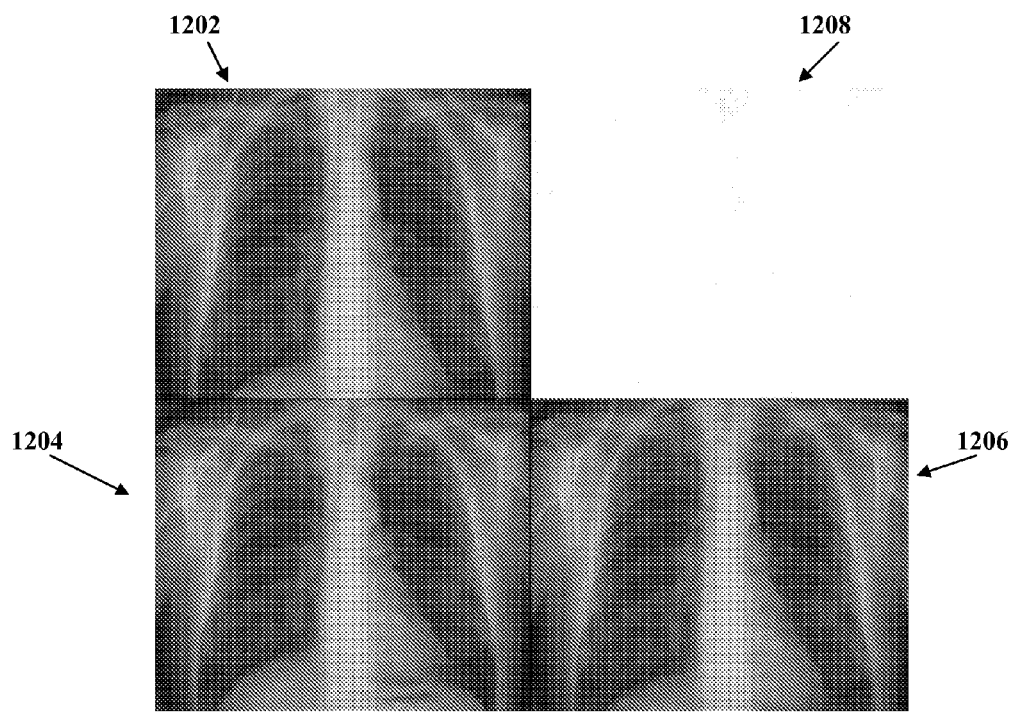
FIG. 12 illustrates exemplary registration results using a sum of squared differences similarity measure according to an embodiment of the present invention.

FIG. 12 illustrates exemplary registration results using the SSD similarity measure according to an embodiment of the present invention. In order to evaluate the performance of the above described methods, an artificial dual energy image pair was generated by warping a first image 1202 non-rigidly to create a second image 1204. The first and second images 1202 and 1204 were registered using the method described above with the SSD similarity measure. Accordingly, the second image 1204 is registered to the first image 1202, resulting in the registered second image 1206. Image 1208 shows an absolute difference between the first image 1202 and the registered second image 1206. As shown in image 1208, since there is little visible absolute difference between image 1202 and the registered second image 1206, the registration is successful.

Figure 13:
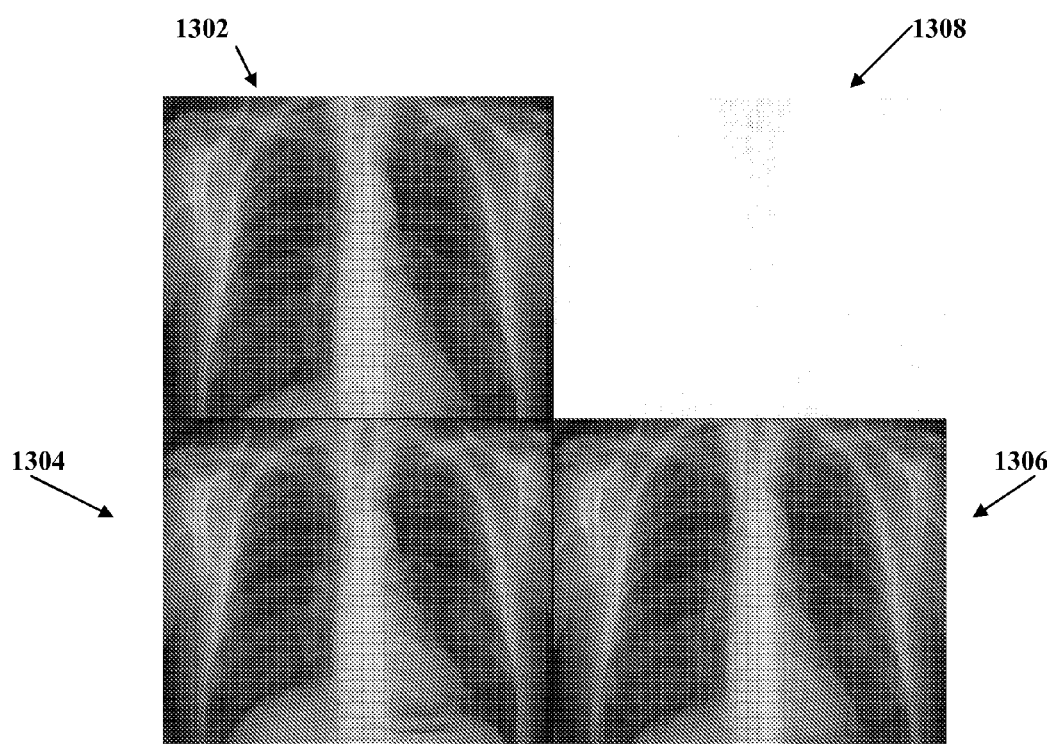
FIG. 13 illustrates exemplary registration results using a cross correlation similarity measure according to an embodiment of the present invention.

FIG. 13 illustrates exemplary registration results using the CC similarity measure according to an embodiment of the present invention. In order to evaluate the performance of the above described methods, an artificial dual energy image pair was generated by warping a first image 1302 non-rigidly to create a second image 1304. The first and second images 1302 and 1304 were registered using the method described above with the CC similarity measure. Accordingly, the second image 1304 is registered to the first image 1302, resulting in the registered second image 1306. Image 1308 shows an absolute difference between the first image 1302 and the registered second image 1306. As shown in image 1308, since there is little visible absolute difference between image 1302 and the registered second image 1306, the registration is successful.

Figure 14:
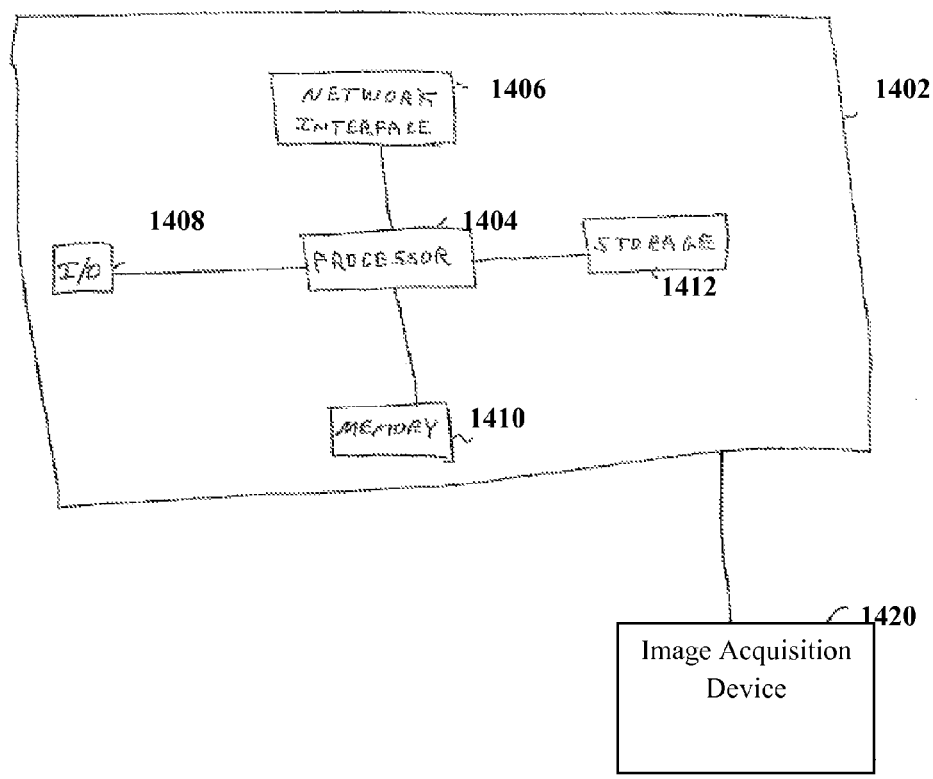
FIG. 14 is a high level block diagram of a computer capable of implementing the present invention.

The above-described methods for dual energy image registration may be implemented on a computer using well-known computer processors, memory units, storage devices, computer software, and other components. A high level block diagram of such a computer is illustrated in FIG. 14. Computer 1402 contains a processor 1404 which controls the overall operation of the computer 1402 by executing computer program instructions which define such operation. The computer program instructions may be stored in a storage device 1412 (e.g., magnetic disk) and loaded into memory 1410 when execution of the computer program instructions is desired. Thus, all method steps described above for registering dual energy images, including the method steps illustrated in FIG. 1 and FIG. 8, may be defined by the computer program instructions stored in the memory 1410 and/or storage 1412 and controlled by the processor 1404 executing the computer program instructions. An image acquisition device 1420, such as an X-ray imaging device, can be connected to the computer 1402 to input images to the computer 1402. It is possible to implement the image acquisition device 1420 and the computer 1402 as one device. It is also possible that the image acquisition device 1420 and the computer 1402 communicate wirelessly through a network. The computer 1402 also includes one or more network interfaces 1406 for communicating with other devices via a network. The computer 1402 also includes other input/output devices 1408 that enable user interaction with the computer 1402 (e.g., display, keyboard, mouse, speakers, buttons, etc.) One skilled in the art will recognize that an implementation of an actual computer could contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for registering a set of dual energy images comprising first and second images, comprising:
generating first and second Gaussian pyramids for said first and second images, respectively, each of said first and second Gaussian pyramids comprising a plurality of pyramid images, each corresponding to one of a plurality of pyramid levels; initializing an optical flow value for a first pyramid level;
sequentially updating the optical flow value for each pyramid level based on the corresponding pyramid images of the first and second Gaussian pyramids based on an optimization function comprising a similarity measure and a regularizer; and
registering said first and second images based on a final optical flow value.

2. The method of claim 1, further comprising:
preprocessing said first and second images to detect edges in said first and second images prior to said step of generating first and second Gaussian pyramids.

3. The method of claim 2, wherein said step of preprocessing said first and second images comprises:
normalizing a magnitude of gradients in said first and second images;
filtering said first and second images using a binarized Laplacian of Gaussian (LoG) filter; and
smoothing said first and second images using one of a Gaussian filter and a nonlinear isotropic diffusion filter.

4. The method of claim 2, wherein said step of preprocessing said first and second images comprises:
preprocessing said first and second images using at least one of a normalization method, a normalized gradient magnitude method, a Harris corner detector, a normalized Laplacian of Gaussian (LoG) filter, a binarized LoG filter, a Gaussian filter, and a nonlinear isotropic diffusion filter.

5. The method of claim 1, wherein said step of initializing an optical flow value for a first pyramid level comprises:
initializing an initial value of said optical flow value as zero for said first pyramid level.

6. The method of claim 1, wherein said step of sequentially updating the optical flow value for each pyramid level based on the corresponding pyramid images of the first and second Gaussian pyramids comprises, for each pyramid level:
iteratively updating an initial value of said optical flow value to optimize the optical flow value for the pyramid images corresponding to the pyramid level based on variational gradients of said similarity measure and said regularizer.

7. The method of claim 6, wherein the initial value of said optical flow value for the first pyramid level is determined in said step of initializing an optical flow value for a first pyramid level, and the initial of the optical flow value for each subsequent pyramid level is the updated optical flow value for a previous pyramid level.

8. The method of claim 1, wherein said similarity measure is one of a sum squared difference similarity measure, a mutual information similarity measure, and a cross correlation similarity measure.

9. The method of claim 1, wherein said regularizer is one of a Laplacian regularizer and a Nagel-Enkelmann regularizer.

10. The method of claim 1, wherein said optimization function is an Euler-Lagrange equation comprising a first term representing said similarity measure and a second term representing said regularizer.

11. The method of claim 1, further comprising, prior to said step of sequentially updating the optical flow value for each pyramid level based on the corresponding pyramid images of the first and second Gaussian pyramids, the steps of:
selecting said similarity measure as one of a sum squared difference similarity measure, a mutual information similarity measure, and a cross correlation similarity measure;
selecting said regularizer as one of a Laplacian regularizer and a Nagel-Enkelmann regularizer; and
discretizing said similarity measure and said regularizer.

12. The method of claim 1, wherein said step of registering said first and second images based on a final optical flow value comprises:
deforming said second image based on,said final optical flow value to compensate for motion between said first and second images.

13. The method of claim 1, further comprising:
weighting and subtracting said first and second images to generate a soft tissue image and a bone image.

14. An apparatus for registering a set of dual energy images comprising first and second images, comprising:
means for generating first and second Gaussian pyramids for said first and second images, respectively, each of said first and second Gaussian pyramids comprising a plurality of pyramid images, each corresponding to one of a plurality of pyramid levels;

means for initializing an optical flow value for a first pyramid level; means for sequentially updating the optical flow value for each pyramid level based on the corresponding pyramid images of the first and second Gaussian pyramids based on an optimization function comprising a similarity measure and a regularizer; and means for registering said first and second images based on a final optical flow value.

15. The apparatus of claim 14, further comprising:

means for preprocessing said first and second images to detect edges in said first and second images.

16. The apparatus of claim 14, wherein said means for sequentially updating the optical flow value for each pyramid level based on the corresponding pyramid images of the first and second Gaussian pyramids comprises:

means for iteratively updating an initial value of said optical flow value for each pyramid level to optimize the optical flow value for the pyramid images corresponding the pyramid level based on variational gradients of said similarity measure and said regularizer.

17. The apparatus of claim 16, wherein the initial value of said optical flow value for the first pyramid level is zero, and the initial of the optical flow value for each subsequent pyramid level is the updated optical flow value for a previous pyramid level.

18. The apparatus of claim 14, wherein said optimization function is an Euler-Lagrange equation comprising a first term representing said similarity measure and a second term representing said regularizer.

19. The apparatus of claim 14, wherein said means for registering said first and second images based on a final optical flow value comprises:

means for deforming said second image based on said final optical flow value to compensate for motion between said first and second images.

20. A non-transitory computer readable medium encoded with computer executable instructions for registering a set of dual energy images comprising first and second images, said computer executable instructions defining steps comprising:

generating first and second Gaussian pyramids for said first and second images, respectively, each of said first and second Gaussian pyramids comprising a plurality of pyramid images, each corresponding to one of a plurality of pyramid levels; initializing an optical flow value for a first pyramid level;

sequentially updating the optical flow value for each pyramid level based on the corresponding pyramid images of the first and second Gaussian pyramids based on an optimization function comprising a similarity measure and a regularizer; and registering said first and second images based on a final optical flow value.

21. The computer readable medium of claim 20, further comprising computer executable instructions defining the step of:

preprocessing said first and second images to detect edges in said first and second images prior to said step of generating first and second Gaussian pyramids.

22. The computer readable medium of claim 21, wherein the computer executable instructions defining the step of preprocessing said first and second images comprise computer executable instructions defining the steps of:

normalizing a magnitude of gradients in said first and second images;

filtering said first and second images using a binarized Laplacian of Gaussian (LoG) filter; and smoothing said first and second images using one of a Gaussian filter and a nonlinear isotropic diffusion filter.

23. The computer readable medium of claim 20, wherein the computer executable instructions defining the step of sequentially updating the optical flow value for each pyramid level based on the corresponding pyramid images of the first and second Gaussian pyramids comprises computer executable instructions defining, for each pyramid level, the step of:

iteratively updating an initial value of said optical flow value to optimize the optical flow value for the pyramid images corresponding to the pyramid level based on variational gradients of said similarity measure and said regularizer.

24. The computer readable medium of claim 23, wherein the initial value of said optical flow value for the first pyramid level is determined in said step of initializing an optical flow value for a first pyramid level, and the initial of the optical flow value for each subsequent pyramid level is the updated optical flow value for a previous pyramid level.

25. The computer readable medium of claim 20, further comprising computer executable instructions defining the steps of:

selecting said similarity measure as one of a sum squared difference similarity measure, a mutual information similarity measure, and a cross correlation similarity measure;

selecting said regularizer as one of a Laplacian regularizer and a Nagel-Enkelmann regularizer; and discretizing said similarity measure and said regularizer.

\* \* \* \* \*